United States Patent [19]
Mitchell et al.

[11] Patent Number: 5,977,287
[45] Date of Patent: Nov. 2, 1999

[54] TREATMENT OF AQUEOUS SYSTEMS USING A CHEMICALLY MODIFIED TANNIN

[75] Inventors: David Brian Mitchell, Arlington Heights; Ralph Lemmel Minnis, Des Plaines; Thomas Peter Curran; Steven M Deboo, both of Lake Zurich; John Arthur Kelly, Crystal Lake; Rashmi Patwardhan, Wheeling; Wun Ten Tai, Palo Hills, all of Ill.

[73] Assignee: BetzDearborn Inc., Trevose, Pa.

[21] Appl. No.: 09/116,500

[22] Filed: Jul. 16, 1998

Related U.S. Application Data

[62] Division of application No. 08/499,098, Jul. 6, 1995, Pat. No. 5,830,315.

[51] Int. Cl.$^6$ .................................................. C08G 8/04
[52] U.S. Cl. ......................... 528/129; 528/162; 528/212; 528/219; 528/230; 527/400; 524/76; 516/167
[58] Field of Search ................................ 524/76; 527/400; 516/164, 167; 252/180; 528/129, 162, 212, 219, 230, 232

[56] References Cited

U.S. PATENT DOCUMENTS

| | | | |
|---|---|---|---|
| 2,575,518 | 11/1951 | Leighton et al. | 528/129 |
| 2,590,760 | 3/1952 | Da Veiga | 524/31.8 |
| 2,819,295 | 1/1958 | Herreck et la. | 527/400 |

(List continued on next page.)

FOREIGN PATENT DOCUMENTS

| | | |
|---|---|---|
| 0630858 | 12/1994 | European Pat. Off. . |
| 57-52357 | 1/1976 | Japan . |
| 1-224004 | 3/1988 | Japan . |
| 1-228541 | 3/1988 | Japan . |
| 3-161411 | 11/1989 | Japan . |
| 703 408 | 2/1954 | United Kingdom . |
| 0899721 | 6/1962 | United Kingdom . |

OTHER PUBLICATIONS

Derwent Publications Ltd., AN 91–019191, Class A60, JP 2292304A (Shinetsu Chem Ind KK), Abstract, Derwent Week 9103.

A. Pizzi, "Condensed Tannins for Adhesives", Eng. Chem. Prod. Res. Dev. (1982), month unknown 21, 359–369.

African Territories Wattle Industry Fund Limited, "The Properties, Composition, Reactions and Industrial Applications of Mimosa Extract", (Jan. 1980).

A. Pizzi, "Phenolic and Tannin–Based Adhesive Resins by Reactions of Coordinated Metal Ligands. II. Tannin Adhesive Preparation, Characteristics, and Applications", Journal of Applied Polymer Science, vol. 24, 1257–1268 (1979). Month unknown.

D. du T. Rossouw, et al., "The Kinetics of Condensation of Phenolic Polyflavonoid Tannins with Aldehydes", Journal of Polymer Science: Polymer Chemistry Edition, vol. 18, 3323–3343 (1980). Month unknown.

*Primary Examiner*—Richard D. Lovering
*Assistant Examiner*—Daniel S. Metzmaier
*Attorney, Agent, or Firm*—Philip H. Von Neida

[57] ABSTRACT

There is provided a composition comprising tannin containing hydroxyl groups which has been (a) chemically modified by reaction of at least one of said hydroxyl groups with at least one member selected from the group consisting of an esterification agent (e.g. acetic anhydride), etherification agent (e.g. dichloromethane or quaternary organic amine such as N-(3-chloro-2-hydroxypropyl) trimethyl ammonium chloride) to form the corresponding ester, or ether, through said hydroxyl group, and (b) derivatized. The chemically modified tannin is derivatized by reaction with aldehyhde (e.g. formaldehyde), or aldehyde and at least one member selected from the group consisting of ammonia and organic amine containing at least one primary or secondary nitrogen (e.g. cyclohexyl amine); said derivatized tannin being water soluble or dispersable at a pH below 7 and water insoluble at a pH above 7. The chemically modified tannins are useful for the coagulation and/or detackification of solid particles suspended in the aqueous system, such as paint particles suspended in the waste water of a paint spray booth operation. Such tannins also have utility for demulsifying oil-in-water emulsions.

6 Claims, 3 Drawing Sheets

U.S. PATENT DOCUMENTS

| | | | |
|---|---|---|---|
| 3,233,026 | 2/1966 | Richter et al. | 264/178 |
| 3,470,148 | 9/1969 | Allan | 210/730 |
| 3,515,556 | 6/1970 | Russell et al. | 430/404 |
| 3,600,308 | 8/1971 | Allan | 210/730 |
| 3,856,845 | 12/1974 | Sears | 252/308 |
| 3,861,887 | 1/1975 | Forney | 95/196 |
| 3,932,488 | 1/1976 | Sears | 560/68 |
| 4,090,919 | 5/1978 | Chibata et al. | 435/178 |
| 4,246,124 | 1/1981 | Swanson | 507/211 |
| 4,496,374 | 1/1985 | Murphy | 95/152 |
| 4,504,395 | 3/1985 | Harpel et al. | 210/712 |
| 4,558,080 | 12/1985 | Quamme et al. | 524/72 |
| 4,579,927 | 4/1986 | Patel et al. | 527/400 |
| 4,734,216 | 3/1988 | Kelly et al. | 510/249 |
| 4,781,839 | 11/1988 | Kelly et al. | 210/725 |
| 4,904,393 | 2/1990 | Mitchell et al. | 210/712 |
| 4,913,825 | 4/1990 | Mitchell | 210/705 |
| 4,944,812 | 7/1990 | Lindert et al. | 148/251 |
| 4,948,513 | 8/1990 | Mitchell | 210/705 |
| 4,964,952 | 10/1990 | Bennison et al. | 162/158 |
| 4,995,944 | 2/1991 | Aston et al. | 162/199 |
| 5,104,549 | 4/1992 | Kamei et al. | 210/682 |
| 5,134,215 | 7/1992 | Huddleston t al. | 527/400 |
| 5,147,964 | 9/1992 | Huddleston et al. | 527/400 |
| 5,152,403 | 10/1992 | Patel | 210/699 |
| 5,176,847 | 1/1993 | Kremer | 252/358 |
| 5,183,575 | 2/1993 | Vasconcellos et al. | 210/724 |
| 5,248,440 | 9/1993 | Mitchell et al. | 210/712 |
| 5,256,304 | 10/1993 | Meyer et al. | 210/708 |
| 5,433,863 | 7/1995 | Braden et al. | 210/708 |
| 5,643,462 | 7/1997 | Chen et al. | 210/730 |
| 5,659,002 | 8/1997 | Reed et al. | 528/129 |

TREATMENT OF AQUEOUS SYSTEMS USING A CHEMICALLY MODIFIED TANNIN

This is a divisional of application Ser. No. 08/499,098 filed Jul. 6, 1995, now U.S. Pat. No. 5,830,315.

FIELD OF THE INVENTION

This invention relates to a composition and a method of coagulating suspended matter in water and for detackifying sticky materials. More particularly, this invention relates to the use of novel tannin derivatives to coagulate and thereby permit removal of solids suspended in aqueous systems, to detackify sticky materials such as aqueous and/or solvent-based paint overspray particles, pitch particles, and the like and to demulsify oil-in-water emulsions in aqueous systems.

BACKGROUND OF THE INVENTION

The flocculation of matter suspended in water to enhance clarification rates is an important aspect of industrial and municipal water treatment. Inorganic coagulants such as lime, alum, ferric chloride, ferrous sulfate, ferric sulfate and sodium aluminate have traditionally been used. These chemicals, while aiding in the removal of suspended solids, generally provide additional quantities of dissolved inorganic solids which can themselves provide water problems, particularly where the water is recirculated in substantial quantities.

Certain polymeric organic coagulants have also proved valuable for flocculation. These polyelectrolytes are often preferred because, in addition to their minimal effect on dissolved solids, they tend to produce less, more compact waste sludge, and they tend not to appreciably affect the pH of the treated water. Cationic polyamines are common commercially available organic coagulants. In addition, high molecular weight polymers such as anionic polyacrylamides have been used to aid in flocculation achieved with primary organic or inorganic coagulants. Anionic polymers are often used in combination with primary organic or inorganic coagulants and aluminum or iron salts to aid in flocculation.

The detackification of sticky materials in aqueous systems is another common problem in many industrial operations. For example, in a commercial paint spraying operation which is performed in a spray painting booth, less than half of the paint used actually coats the surface to be painted, with the remainder representing overspray. The overspray is removed from the paint spray booth by air currents which are scrubbed by recirculating water. The oversprayed paint particles become entrained in the spray booth water which, if untreated, may cause plugging of piping and spray nozzles thus reducing the operating efficiency of the spray booth and increasing the voc emissions. In the spray application of solvent based paints such as polyurethanes, epoxy resins, lacquers, enamels, as well as waterborne paints, it is normally necessary to trap the oversprayed coating materials in some way to avoid their building up on the walls and exhaust system surfaces of the spray booth. In many large industrial installations, including especially auto body painting systems, oversprayed coating materials are collected in water curtains which cascade down the interior spray booth walls. The agglomeration and accumulation of live coating material in the water supply of these systems results in serious problems, such as blockage of the pipes and pumps which circulate the water, and a build-up of paint on the walls of the booth beyond the water curtain. As more and more coating material is sprayed in the booth, the material removed from the air builds up in the water in the form of a tar-like coherent sludge which in a short time can foul the pumps and lines of the paint spray booth recirculating water system. Furthermore, this sludge is extremely difficult to remove from the pump, lines, reservoir, and other internal surfaces of the system with which it comes in contact. The accumulation of coating materials in the bottom of the water reservoir also creates a serious problem when the system is periodically cleaned out, with much effort being required to remove the heavy build-up of coating material on the bottom of the reservoir. Many present paint spray booth detackification treatments are based upon clays (e.g. hectorite or bentonite), amphoteric metals (e.g. sodium zincate) and polymers (e.g. diallyldimethyl ammonium chloride and melamine aldehydes) or a combination of these.

While the majority of paints currently used in the market are organic solvent based, in an attempt to lower VOC emissions from the painting operation, the use of waterborne coatings is becoming increasingly more common. Waterborne paints are resin suspensions stabilized by a surfactant matrix which upon incorporation into the paint spray booth water disperse and/or emulsify resulting in an increase in both suspended and dissolved solids. While these solids must be coagulated and removed from the spray booth water in order to maintain an effective painting operation, these solids do not require detackification as required by organic solvent based paints. These paint solids require agglomeration for effective removal from the system.

There are, however, some paint spray booth operations wherein both organic solvent based paints and waterborne paints are sprayed into the same booth. Due to major differences in the formulations of waterborne paints and solvent based paints, separate paint detackification agents have heretofore been necessary to treat the respective paint particles in the spray booth water. Consequently it would represent a major benefit if a single water treating agent could act not only as a coagulant but could also act as a detackifier or optionally if the coagulant could be used in combination with a detackifier without decreasing the performance of the detackifier.

Various inorganic compounds have been used as flocculating and coagulating agents in paint spray booth water treatment systems.

More specifically, coagulation involves the addition of a cationic material which reduces the negative zeta potential of a particle. This results in agglomeration of two particles or more, providing a pin floc. All coagulants are typically cationic in their operation pH range.

Detackification involves the adsorption of the material added to a paint particle (as disclosed in this invention) similar to a coagulant. However, not all detackifiers are recognized as coagulants. For example, inorganic clays are detackifiers but they do not perform as coagulants. This is because they do not have overall cationic charge and therefore do not agglomerate particles, which generally have a negative charge.

In addition, not all coagulants are effective detackifiers, since a detackifier after adsorption to the paint particle must render the paint non-sticky. Addition of inorganic coagulants such as alum or organic polymeric coagulants, such as DMA-EPI's, do not provide a non-tacky paint.

Flocculation is the briding of pin flocs (which are 2 or more particles, doublets, agglomerated or coalesced by a coagulant). The effective range of this bridging is much greater than a coagulant because the molecular weight of the material is 2–3 orders of magnitude greater. Reduction of the surface charge of the particle, zeta potential, is also not as important as with a coagulant. As a result, flocculants can be anionic or nonionic in addition to cationic.

For example, aluminum sulfate, also known in the trade as alum, has been used extensively as a coagulant in paint spray booth water. However, the use of inorganic treating agents have numerous disadvantages, in particular they produce high volumes of residual waste sludge. Furthermore, none of the inorganic treating agents are effective for detackifying a broad range of solvent paints. It is, therefore, desirable to treat the water in the booth in such a way as to render the oversprayed coating material free of stickiness and tackiness so that it will readily separate itself from the water, not adhere to the curtain walls, pipes, pumps and other internals of the spray booth system. It is also desirable to coagulate the paint particles to form a detackified floating sludge.

One approach to detackification has been to combine certain polymeric materials with amphoteric metals. Thus, for example, U.S. Pat. No. 3,861,887 discloses treatment of paint booth wash water with a blend of polycationic water dispersible polymer with a water-soluble salt of an amphoteric metal to reduce the tackiness of paint. One problem with this approach is that use of metals, such as zinc, can create additional disposal concerns for the wastewater and sludge recovered from it.

Another approach has been to use clay-based treatment. For example, U.S. Pat. No. 4,504,395 discloses that certain hectorite clays can be effectively used to detackify oversprayed paint. A problem with this approach is that the sludge produced using clays can be difficult to dewater, resulting in larger volumes of potentially hazardous materials requiring haul-out to a secure landfill.

Another industrial process which experiences problems with sticky materials in aqueous systems is a pulp and papermaking system which uses a pulp suspension derived from natural cellulosic fibers containing pitch particles and/ or recycled pulp containing residual ink, adhesives, anionic trash, etc. These sticky materials adhere to the pulp and paper making equipment resulting in sticky deposits which negatively affect the operation of the paper making equipment. One approach to this problem has been the use of pulp additives such as anionic aryl sulfonic acid-formaldehyde condensates or cationic dicyandiamide-formaldehyde condensates. However, there remains a need for effective treatment agents which detackify sticky material in industrial aqueous systems, such as paint overspray particles, pitch and stickies in papermaking systems, etc.

Yet another problem in industrial aqueous systems is the treatment of wastewater streams containing emulsified oil, i.e. oil-in-water emulsions. Inorganic coagulants alone or in combination with organic polyelectrolytes have been used in demulsification. However, these treatments are not completely satisfactory because they increase solids content, which can cause waste stream disposal problems.

Tannins occur naturally in various vegetative materials including barks and woods. Established industrial practices of extracting tannins from the wood of the quebracho tree and the bark of the wattle tree have made condensed tannins available in substantial quantities. Condensed tannins are polyphenolic and polymerize in combination with other chemicals such as formaldehyde. A. Pizzi, in "Condensed Tannins for Adhesives" *Ind. Eng. Chem. Prod. Res. Dev.* 1982, 21, 359–369 discusses natural tannins and their particular use in the manufacture of particle board, plywood, and other industrial products which incorporate adhesives.

British Pat. No. 899,721 discloses use of a reaction product of a tannin, a formaldehyde and an amino or ammonium compound in the flocculation of suspensions such as sewage, industrial waste, and natural water. The disclosed advantages of using these flocculants are that they do not affect the pH of the suspension and that they do not affect the dissolved inorganic solids content of the treated water.

U.S. Pat. No. 4,558,080 discloses the production of stable tannin-based flocculants made by polymerizing tannin with an aldehyde (e.g. formaldehyde) and an amino compound (e.g. monoethanolamine) while monitoring the viscosity of the reacting mixture.

U.S. Pat. No. 4,734,216 discloses a flocculating composition comprising the polymerized tannin described in U.S. Pat. No. 4,558,080 in combination with an inorganic flocculant such as aluminum sulfate or iron chloride.

U.S. Pat. No. 4,948,513 discloses a method for detackifying spray booth water using a composition comprising the polymerized tannin of U.S. Pat. No. 4,558,080 in combination with a hydrophillic-lipophillic copolymer and/or a diallyl dimethyl ammonium chloride polymer.

U.S. Pat. No. 4,944,812 discloses aqueous solutions of the reaction product of a vegetable tannin, an aldehyde (e.g. formaldehyde), and an amine, (e.g. diethanol amine) for the treatment of metals to enhance corrosion resistance.

U.S. Pat. No. 5,256,304 discloses the reaction product of a tannin, diallyl dimethyl ammonium chloride (DADMAC) and an aldehyde for use in removing metal ions from oil waste waters by demulsification and flocculation.

European Publication No. 630,858 discloses a water soluble or dispersible tannin containing polymer composition having the formula Tannin-[N-C-A]

for water clarification. The N-C-A moiety represents polymer comprised of monomers N, C, and A. N represents a nonionic monomer, C represents a cationic monomer, and A represents an anionic monomer, with monomers N and C being optional. The preferred cationic monomer C is dimethylaminoethyl acrylate. Allyl and ethoxylated allyl ethers of polyalkylene glycol are disclosed as a suitable nonionic monomers. All polymerization appears to occur through free radical initiation of the double bond.

While these tannins have been used as described to treat industrial aqueous systems, the search has continued for ways to increase the efficiency of flocculation and clarification while reducing material consumption and other costs.

SUMMARY OF THE INVENTION

In accordance with one aspect of the present invention, there is provided novel compositions of matter which are useful for treating aqueous systems to coagulate, and/or detackify solids suspended therein to permit their removal from such aqueous systems comprising tannin, containing hydroxyl groups chemically modified by reaction of at least one of said hydroxyl groups with at least one member selected from the group consisting of an esterification agent and etherification agent, preferably cationic etherification agent such as a halogentaed quaternary organic amine to form the corresponding ester, or ether, through said hydroxyl group.

The chemically modified tannin is then further derivatized by reaction with an aldehyde or a combination of aldehyde, and ammonia or organic amine containing at least one primary or secondary nitrogen atom. The derivatized tannin is water soluble or dispersable at a pH below 7 and water insoluble at a pH above 7.

Also provided in accordance with this invention are methods for using the above compositions to coagulate, and/or detackify sticky particles found in various aqueous systems, such as spray paint particles present in paint spray booth water.

In another aspect of the present invention there is provided methods for demulsifying oil-in-water emulsions using the above-mentioned additives.

It has been found that the properties, for the above described purposes, of natural tannins can be modified advantageously by capping at least some of the free phenolic hydroxyl groups present on said tannins. The capping agents are used to influence the hydrophobic/hydrophillic properties of the tannin under varying pH conditions. The properties of these chemically modified tannins are then further improved by derivatizing them through conventional phenol/aldehyde or Mannich type reactions such that low residual formaldehyde concentrations (e.g. <500 ppm) are obtainable.

DETAILED DESCRIPTION OF THE INVENTION

The present invention is directed to novel chemically modified and derivatized tannin compositions, and to methods of their manufacture and use thereof as a coagulant, as a detackifying agent, and/or as a demulsifier to treat various industrial aqueous systems.

The chemically modified tannin of the present invention is the reaction product of a tannin component and at least one of an esterification agent, or etherification agent.

Starting Tannin Component

The tannin which is chemically modified in accordance with the present invention can be obtained from the various wood and vegetation materials found throughout the world. Tannins are a large group of water-soluble, complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho, chestnut, oak and urunday. Examples of fruits are myrobalans, valonia, divi—divi, tara, and algarrobilla. Examples of leaves are sumac and gambier and examples of roots are canaigre and palmetto. Among the preferred materials are the quebracho wood. A spray-dried quebracho powder is sold by Canada Packers, Ltd. as Mimosa Extract.

These natural tannins can be categorized into the traditional "hydrolyzable" tannins and "condensed tannins" as disclosed by A. Pizzi in "Condensed Tannins for Adhesives", *Ind. Eng. Chem. Prod. Res. Dev.* 1982, 21, 359–369.

Condensed tannin extracts are those manufactured from the bark of the black wattle tree (or mimosa tannin of commerce), from the wood of the quebracho tree (Spanish: Quebra hacha, axe-breaker,) from the bark of the hemlock tree, and from the bark of several commonly used pine species. The preparation of wattle and quebracho (the most preferred tannins for use herein) extracts is a well established industrial practice and they are freely available in considerable amounts.

Condensed tannin extracts, such as wattle and quebracho, are composed of approximately 70% polyphenolic tannins, 20% to 25% nontannins, mainly simple sugars and polymeric carbohydrates (hydrocolloid gums), the latter of which constitute 3% to 6% of the extract and heavily contribute to extract viscosity, while the balance is accounted for by a low percentage of moisture. Although the exact structure is not known, it is believed that the main polyphenolic pattern in quebracho tannins is represented by repeating flavonoid analogues based on resorcinol A and pyrogallo B rings as shown in Formula I below:

(I)

wherein n, which can be the same or different, is typically zero or 1. Thus, the above flavonoid of Formula I is typically repeated 2 to 11, preferably 3 to 6, most preferably 4 to 5 times in typical condensed tannins through carbon-carbon linkages at the 4- and 6- or 4- and 8-positions. A typical biflavonoid with two repeating Formula I structures, linked at the 4- and 8-positions, is illustrated at Formula II.

(II)

wherein n is as described for Formula I.

It is conventional to illustrate the presence of a repeating structure naturally found in tannins by drawing the structure of Formula I with the stick structure at the 4- and 6- or 4- and 8-positions as follows:

(III)

The present invention also contemplates the use of monoflavonoids, which for purposes of the present invention are included within the term tannin.

In view of the above, it will be understood that vegetable tannins are not pure chemical components with known structures, but rather contain numerous components, the most useful of which for purposes of the present invention are phenolic moieties such as catechol, pyrogallol and so forth, condensed into a complicated polymeric structure. For purposes of the present invention, it is these multicomponent phenolic containing structures which are referred to collectively herein as "tannins".

The weight average molecular weight of the tannins can range typically from about 300 to about 3000, preferably from about 300 to about 2000 and most preferably from about 500 to about 1500.

Chemical modification of the tannin is accomplished in accordance with the present invention through at least one of the reactions selected from esterification, and etherification.

Esterification in the context of the present invention is the production of an ester group through reaction of one or more of the hydroxyl groups, preferably phenolic hydroxyl groups, of the tannin. This reaction is sometimes also referred to as acylation where the acid reactant is something other than the free acid, i.e. the acid reactant is characterized by the presence of an acyl group. An acyl group is an organic acid group COOH, in which the OH of the carboxyl group is replaced by some other substituent, e.g. halide, oxygen of an anhydride, etc. Thus, in the present invention, acylation is included within the term esterification. Representative acyl groups include acetyl ($CH_3CO-$), and benzoyl ($C_6H_5CO-$).

Etherification is formation of an ether linkage through the oxygen of a tannin hydroxyl group, preferably phenolic tannin hydroxyl group.

The preferred etherification agent is cationic, such as a quaternary ammonium compound capable of undergoing etherification.

More specifically, the esterified tannin compositions for use in the present invention may be prepared by any method well known in the art, such as by contacting the tannin with an organic acid or acid halide, preferably anhydrous organic acid, most preferably an organic acid anhydride, and pyridine, by contacting the tannin with an organic acid, preferably anhydrous organic acid, most preferably an organic acid anhydride, and anhydrous sodium acid salt mixtures, or by contacting the tannin with an organic acid, preferably anhydrous organic acid, most preferably an organic acid anhydride solution containing a drop or two of sulphuric, perchloric, or phosphoric acid as catalyst. The preferred method is to react the tannin with an organic acid or acid anhydride alone or under anhydrous conditions. Esterification of hydroxyl groups, preferably phenolic hydroxyl groups with fatty acids, can be accomplished in a two stage reaction involving acetylation with acetic anhydride under reflux at 120–130° C. followed by reaction of acetylated product with the fatty acid under reflux while removing excess acetic acid by vacuum distillation.

Suitable organic acids can be represented by the structural Formula IV:

$$R^1-COOH \qquad (IV)$$

wherein $R^1$ is a substituted or unsubstituted, aliphatic or aromatic, saturated or unsaturated, linear, branched or cyclic, hetero (e.g., nitrogen, oxygen, sulfur, halogen) or non-hetero atom containing hydrocarbyl group, more typically a hydrocarbyl group containing from about 1 to about 60 carbon atoms, most typically a hydrocarbyl group selected from the group consisting of alkyl, typically $C_1$ to $C_{30}$ alkyl, preferably $C_1$ to $C_{10}$ alkyl, most preferably $C_1$ to $C_3$ alkyl; alkenyl, typically $C_2$ to $C_{30}$ alkenyl, preferably $C_2$ to $C_{10}$ alkenyl, most preferably $C_2$ to $C_5$ alkenyl; aryl, typically $C_6$ to $C_{10}$ aryl, preferably $C_6$ aryl; arakyl, or alkaryl, wherein the alkyl and aryl portions thereof are as described above, and cycloalkyl or cycloalkenyl, typically $C_5$ to $C_{10}$, preferably $C_6$ to $C_8$ cycloalkyl or cycloalkenyl.

The substituents which can be present on the hydrocarbyl groups include any functional group which is capable of imparting the desired hydrophylic/hydrophobic balance in conjunction with the remainder of the chemically modified and derivatized tannin to render it water soluble or dispersable at pH's increasingly less than about 7 and water insoluble at pH's increasingly above 7 relative to the corresponding chemically unmodified (i.e., free phenol containing) and/or chemically unmodified but derivatized tannin.

As used herein, the terminology "functional group" refers to functional groups which include, but are not limited to hydroxyl, halo, amino sulfate, sulfonate, carboxyl, phosphate, and phosphonate groups, amino, amido and the like and mixtures thereof, which enhance the water solubility of long chain, cyclic or aromatic hydrocarbons which might otherwise be insoluble in water at pH's below 7.

Representative examples of suitable acids include saturated acids such as those of the formula $CH_3(CH_2)_nCOOH$ wherein n is a number of from about 0 to about 16, including acetic acid, propionic acid, butyric acid, pentanoic acid, hexanoic acid $CH_3(CH_2)_4COOH$; octanoic acid $CH_3(CH_2)_6COOH$; nonanoic acid $CH_3(CH_2)_7COOH$; decanoic acid $CH_3(CH_2)_8COOH$; undecanoic acid $CH_3(CH_2)_9COOH$; lauric acid $CH_3(CH_2)_{10}COOH$; tridecanoic acid $CH_3(CH_2)_{11}COOH$; myristic acid $CH_3(CH_2)_{12}COOH$; pentadecanoic acid $CH_3(CH_2)_{13}COOH$; palmitic acid $CH_3(CH_2)_{14}COOH$; heptadecanoic acid $CH_3(CH_2)_{15}COOH$; and the like; cycloaliphatic acids such as cyclohexane carboxylic acid; unsaturated acids such as those of the formula $CH_3(CH_2)_7 CH=(CH_2)_nCOOH$, wherein n is a number of from about 1 to about 13, including elgidic acid $CH_3(CH_2)_7 CH=(CH_2)_7 COOH$; erucic acid $CH_3(CH_2)_7CH=(CH_2)_7 COOH$; nervonic acid $CH_3(CH_2)_7CH=(CH_2)_{13}COOH$; and the like; aromatic carboxylic acids such as benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid or naphthoic acids; hydroxy aromatic acids such as hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid; dicarboxylic acids such as aliphatic dicarboxylic acids having 3–12 carbon atoms, in particular malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. In place of the carboxylic acids, the anhydrides or reactive carboxylic acid derivatives, if present, can also be employed.

Saturated acids are preferred over unsaturated acids. In addition, a cyclic anhydride such as succinic anhydride can react and esterify two adjacent tannin hydroxyl groups by forming cyclic ester structures.

The most preferred esterification reactant is acetic anhydride.

Etherification is accomplished by any conventional technique, such as by reaction of a hydrocarbyl halide in the presence of an alkaline base such as sodium hydroxide or potassium hydroxide. Alternatively, etherification can be accomplished by nucleophilic displacement of dihydrocarbyl sulfates, e.g. dimethyl sulfate, by phenoxide anions.

Suitable hydrocarbyl halide reactants can be represented by the structural Formula V:

$$R^2-(X)_n \qquad (V)$$

wherein $R^2$ is a hydrocarbyl group as described in connection with $R^1$ of Formula IV; X is a halide, preferably chlorine or bromine; and n is a number representing the number of halogen groups on $R^2$ which can vary from about 1 to about 5.

Representative examples of suitable $R^2$ hydrocarbyl groups include methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl, and the corresponding unbranched or branched heptyl, octyl, nonyl, decyl, undecyl, dodecyl, tridecyl and pentadecyl radicals; alkenyl groups such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl; cycloalkyl groups such as cyclopropyl, cyclobutyl, cyclopentyl, cyclohexyl, cycloheptyl and cyclooctyl; cycloalkenyl such as 1-cyclopentenyl, 2-cyclopentenyl, 3-cyclopentenyl, 1-cyclohexenyl, 2-cyclohexenyl; aryl such as phenyl, naphthyl; and aralkyl such as benzyl, and 2-phenylethyl.

Specific examples of suitable halides include methyl chloride, ethyl chloride, methyl bromide, ethyl bromide, methyl iodide, ethyl iodide, propyl chloride, propyl bromide, propyl iodide, isopropyl chloride, isopropyl bromide, isopropyl iodide, butyl bromide, n-butyl bromide, n-pentyl bromide, n-hexyl chloride, n-octyl chloride, n-decyl chloride, benzyl chloride, phenethyl chloride, and benzyhydryl chloride.

The preferred halide is an alkyl halide, most preferably dicloromethane.

The substituents on the $R^2$ groups can be the same as described in connection with the Formula IV and are selected to impart the same solubility characteristics at the pH's indicated in connection with the description of Formula IV.

The preferred etherification agent and reaction conditions are selected to make the chemically modified tannin amphoteric. This is accomplished with quaternary ammonium salt compound capable of reacting with the tannin hydroxyl groups. This is preferably accomplished by including at least one halogenated hydrocarbyl group, as one of the hydrocarbyl groups of the quaternary amine through which the etherification reaction can occur. Thus, the quaternary amine represents a preferred sub-genus of hydrocarbyl halide. It is preferred because it also imparts a cationic charge to the tannin.

It will be understood that the etherification reaction will proceed in accordance with the following reaction:

(Eq. 1)

wherein x is halogen and $R^3$ to $R^6$ are as described herein at Formula VI. Thus, the halogen (X) on the quat amine starting material is displaced from the carbon which participates in the ether linkage with the tannin.

The water solubility of the unreacted tannin at high pH is ensured by the hydroxyl groups. However, at a high pH, as each cationic charge is reacted onto the tannin, it begins to lose its solubility. This stems from the fact that it is now amphoteric, i.e. it has cationic and anionic sites. Consequently, as the pH is raised, the hydroxide sites are deprotonated thereby increasing the anionicity of the amphoteric molecule. The presence of both cationic and anionic charges on the derivatized tannin at increasing pH contributes to its insolubility, along with the hydrophylic/hydrophobic character imparted to the salt by its hydrocarbyl groups.

Suitable quaternary hydrocarbyl ammonium salt compounds can be represented by structural Formula VI:

(VI)

wherein $R^3$ to $R^6$, which can be the same or different, are hydrocarbyl groups as defined in connection with $R^1$ of Formula IV and particularly $R^2$ of Formula V, with the proviso that at least one of the hydrocarbyl groups is halogen substituted and capable of undergoing an etherification reaction. More typically the hydrocarbyl groups are independently selected from the group consisting of: (i) halogen substituted, saturated or unsaturated, linear, branched or cyclic hydrocarbon chain of 1 to 30, preferably 1 to 15, most preferably 1 to 5 carbons; and (ii) substituted or unsubstituted, saturated or unsaturated, linear, branched or cyclic hydrocarbon chain of 1 to 30 carbons optionally comprising at least one heteroatom selected from the group consisting of nitrogen, oxygen, sulfur and halogen within the hydrocarbon chain; and wherein any two or more of $R^3$ to $R^6$ together can constitute part of a cyclic ring structure. $Y^-$ is an anion in an amount sufficient to satisfy the ammonium cation's charge and is preferably selected from the group consisting of halide (chloride, bromide, iodide, fluoride), sulfonate, phosphate, phosphonate, hydroxyl nitrate, sulfate, alkysulfate, and carboxylate.

Representative substituents on the hydrocarbyl groups constituting $R^3$ to $R^6$ include hydroxyl, halogen (preferably chlorine or bromine), sulfate aminio, amino, amido, sulfonate, carboxyl, phosphate and phosphonate groups. As indicated above, at least one of the $R^3$ to $R^6$ hydrocarbyl substituents is halogen substituted.

More specifically, $R^3$ to $R^6$ of Formula VI can be independently selected from the group consisting of alkyl, typically $C_1$ to $C_{30}$ alkyl, preferably $C_1$ to $C_{15}$ alkyl, most preferably $C_1$ to $C_{10}$ alkyl; hydroxy and/or halo substituted alkyl, typically $C_1$ to $C_{30}$ hydroxy and/or halo substituted alkyl, preferably $C_1$ to $C_{15}$ hydroxy and/or halo substituted alkyl, most preferably $C_1$ to $C_5$ hydroxy and/or halo substituted alkyl; alkenyl, typically $C_1$ to $C_{30}$ alkenyl, preferably $C_1$ to $C_{15}$ alkenyl; aryl, typically $C_6$ to $C_{10}$ aryl; cycloalkyl, typically $C_5$ to $C_8$ cycloalkyl; ethoxylated hydrocarbyl groups, typically ethoxylated hydrocarbyl groups containing typically from about 1 to about 50, preferably 5 to about 30, most preferably 10 to about 20 moles of ethylene oxide.

It will be understood that the nature of the hydrocarbyl groups constituting $R^3$ to $R^6$ of the quaternary ammonium salt can be varied to impart a desired hydrophylic/hydrophobic balance thereto and hence to the tannin with which it is reacted. It has been found that this balance is controlled to impart solubility characteristics to the chemically modified and/or chemically modified and derivatized tannin as described in connection with Formula IV.

It should be understood that either a mixture of hydrophobic and hydrophilic ammonium salts sufficient to provide the resultant tannin with the proper hydrophilic/hydrophobic balance, can be employed, or alternatively a tannin modified with ammonium salts having both hydrophobic and hydrophilic groups may be employed to accomplish the same result.

Accordingly, useful hydrophilic quaternary ammonium salts include ethoxylated quaternary ammonium salts that contain at least one hydrocarbon chain having from about 2 to about 30 carbon atoms; and at least one hydrophilic carbon chain having greater than about 9 moles of ethylene oxide. Examples of suitable ethoxylated quaternary ammonium compounds include the following: dihydrogenated tallow-chloromethyl-[ethoxylated (33)] ammonium chloride; hydrogenated tallow-chloromethyl-[ethoxylated (15)] ammonium chloride; hydrogenated tallow-chloromethyl-[ethoxylated (30)] ammonium chloride; and hydrogenated tallow-chloromethyl-[ethoxylated (50)] ammonium chloride.

Useful hydrophobic quaternary ammonium salts include halogen substituted:monomethyl trialkyl quaternaries, dimethyl dialkyl quaternaries, and cyclic amines, including (2-chloroethyl)-trimethyl ammonium chloride, (3-bromopropyl) triethylammonium bromide, N-(12-chlorohexadecyl)-N-(hexadecyl)dimethylammonium chloride, N-(chloromethyl)-N-(methyl) distearyl ammonium sulfate, N-(bromomethyl)-N-(methyl) ditallow ammonium chloride, N-(16-bromohexadecyl)-N-(hexadecyl) dimethyl ammonium chloride, di(hydrogenated tallow) dichloromethyl ammonium chloride, dioctadecyl dibromomethyl ammonium chloride, N-(chloromethyl)-N-(methyl) dieicosyl ammonium chloride, (N-(chloromethyl)-N-(methyl) didocosyl ammonium chloride, (N-(chloromethyl)-N-(methyl) di(hydrogenated tallow) ammonium acetate, N-(chloromethyl)-N-(methyl) dihexadecyl ammonium acetate, ditallow di-2-chloropropyl ammonium phosphate, N-(chloromethyl)-N-(methyl) ditallow ammonium nitrate, N-(chloromethyl)-N-(methyl) di(coconutalkyl) ammonium chloride, bromo-stearyl dimethyl benzyl ammonium chloride and N-(chloromethyl)-N-(methyl) diallyl ammonium chloride.

Ammonium salts with intermediate hydrophobicity include halogen, and halogen and hydroxy, substituted alkyl ammonium salts such as mono(monohydroxy monohalo $C_1$–$C_8$ alkyl) tri $C_1$–$C_8$ alkyl ammonium salts, N-(monohydroxy monohalo $C_1$–$C_8$ alkyl) N-(monohydroxy $C_1$–$C_8$ alkyl) di $C_1$–$C_8$ alkyl ammonium salts, tri (monohydroxy $C_1$–$C_8$ alkyl) monohalo $C_1$–$C_8$ alkyl ammonium salts, tri(monohydroxy $C_1$–$C_8$ alkyl) mono (monohydroxymonohalo $C_1$–$C_8$ alkyl) ammonium salts, including N-(2-chloro-2-hydroxyethyl) trimethyl ammonium bromide, N-(1-hydroxy-4-chloro-butyl) tripropyl ammonium nitrate, N-(1-hydroxy-6-chloro-hexyl) di(1-hydroxyhexyl) methyl ammonium bromide, tetra(3-hydroxyoctyl) ammonium chloride, N-(3-chloro-2-hydroxypropyl)-di(methyl)-dodecyl ammonium chloride; and (3-chloro-2-hydroxypropyl) di-(methyl)-octadecyl ammonium chloride, as well as the halo substituted quaternization products of esters of di- and triethanolamine with long-chain fatty acids (lauric acid, myristic acid, palmitic acid, stearic acid, behenic acid, oleic acid and mixtures of fatty acids such as coconut fatty acid, tallow fatty acid, hydrogenated tallow fatty acid and tall oil fatty acid), such as the distearyl ester of N-chloromethyltriethanolammonium chloride, and the distearyl ester of N-chloromethyltriethanolammonium methosulphate.

The most preferred quaternary ammonium salts are N-(monohydroxymonochloro $C_1$–$C_8$-alkyl) tri $C_1$–$C_4$-alkyl ammonium salts such as N-(3-chloro-2-hydroxypropyl) trimethyl ammonium chloride, and N-(4-chloro-1-hydroxybutyl triethyl ammonium chloride.

The charge density of the tannin is also increased by reaction with the quaternary amine. The most preferred charge density of the quaternized tannin being about 2.0 meq/g.

The degree to which the hydroxyl groups on the tannin are chemically modified by esterification, or etherification is most desirably expressed as a mole ratio of tannin:chemical modification agent. The mole ratio is based on the weight of reactants added to the reaction mixture and assumes 100% of added reactants react. A gram atom molecular weight of the tannin monoflavanoid unit of 300 is employed in the molecular weight determination.

Accordingly, the tannin:chemical modification agent mole ratio is controlled to be typically from about 0.1:1 to about 4:1, preferably from about 0.5:1 to about 3.5:1, and most preferably from about 0.5:1 to about 3:1 (e.g. 0.5:1 to 2:1).

In view of the above, the chemically modified tannin can be represented by the following structural formula:

(VII)

wherein Z, which may be the same or different, is independently selected from the group consisting of hydrogen, $R^2$—, and —$(R^3)(R^4)(R^5)(R^6)N^+$ wherein $R^1$ to $R^6$ are as described above, and n is a number which can vary from about 0 to 2, with the proviso that at least one Z is not hydrogen.

Derivatization of the Chemically Modified Tannin

The chemically modified tannins described above are derivatized by one or more different known reactions attributable primarily to the phenolic nature of the materials. Such derivatization reactions have the effect of further modifying the properties of the chemically modified tannin, preferably by oligiomerizing or polymerizing said tannin molecules. For ease of discussion, the term "polymerize" is defined herein to include oligiomerization to form dimers, trimers and the like, as well as crosslinking three or more chemically modified tannins.

Preferred reactions for derivatizing the chemically modified tannins include phenol/aldehyde condensation, and Mannich reactions.

Phenol/Aldehyde Condensation

Formaldehyde reacts with the chemically modified phenolic tannins to produce polymerization in the presence of acid or alkali catalysts through methylene bridge linkages at reactive positions on the flavonoid molecules. Such reactive positions are primarily located on the A ring at positions 6- and 8- thereof. This reaction is illustrated by the following reaction using formaldehyde:

Tannin+HCHO→Tannin-CH$_2$-Tannin       (Eq. 2)

While the pyrogallol or catechol type B-rings of the tannin are relatively unreactive, their reactivity can be increased with bivalent metal ions such as zinc acetate, thereby facilitating crosslinking. However, the degree of crosslinking achievable with tannin/formaldehyde mixtures is limited by steric interactions due to early immobilization of the network by relatively few methylene bridges.

Accordingly, the degree of cross-linking may be increased by employing reagents with longer molecules capable of bridging the distances between reactive sites in the tannin formaldehyde network. Thus, the degree of crosslinking can be increased by adding a small quantity of a suitable urea-formaldehyde (UF) resin. The same effect may be achieved by the addition of phenol-resorcinol-formaldehyde (PRF) or phenol-formaldehyde (PF) resins in small quantities.

Alternatively, one can condense phenol, resorcinol or their mixtures with the tannin in the presence of formaldehyde. In this way, relatively small molecules act as crosslinking agents between the much larger flavonoid units as shown in the following Formula VIII derived from the reaction of tannin, resorcinol, and formaldehyde:

(VIII)

The above techniques are well known.

While the above discussion has concentrated on the use of formaldehyde, it will be apparent that the subject reactions are applicable to aldehydes in general with formaldehyde being preferred.

Where formaldehyde is employed, it can be used in the form of a 37% active formaldehyde solution. This is also commercially available as formalin which is an aqueous solution of 37% formaldehyde which has been stabilized with from 6–15% methanol. Other commercial grades of formaldehyde and its polymers could be used. Such commercial grades include 44, 45 and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves.

Also suitable are aldehyde containing or generating reactants. Thus, organic chemical compounds which contain at least one aldehyde group may be employed. These materials are well known and include, for example, acetaldehyde, propionaldehyde, glycoaldehyde, glyoxylic acid and the like or polyaldehydes, i.e. organic compounds having more than one aldehyde group in the compound, such as glyoxal, paraformaldehyde, and the like. Aldehyde generating agents are known organic compounds capable of forming an aldehyde group in situ, such as melamine-formaldehyde monomeric products and derivatives such as tri and hexa (methylol) melamine and the tri and hexa ($C_1$–$C_3$ alkoxymethyl)melamine. Such materials can be formed by known conventional methods.

Mannich Reaction

The chemically modified tannins of the present invention will react (condense) with aldehydes and a nitrogen-containing compound selected from ammonia and organic amines, typically under acidic conditions in a Mannich-type reaction. The nature of the resultant product will depend on the nature of the reactive amines (i.e., whether primary or secondary nitrogens in the amine), and the molar ratio of tannin:amine:aldehyde employed.

Using formaldehyde as representative of the aldehyde reactant, primary amines are capable of polymerizing the tannin through methylene bridges at the active tannin sites, which tannin active sites are the same as previously described in connection with the phenol/aldehyde condensation, namely, primarily at the 6- and 8-positions of the "A" ring. The following Equation 3 illustrates this reaction:

(Eq. 3)

In contrast, a secondary amine reacts only once with the aldehyde as illustrated by the following Equation 4:

(Eq. 4)

The nitrogen in the resultant non-polymerized product will protonate at acidic pH to form a cation. It will be further understood that the reactivity of the aldehyde, such as formaldehyde in the phenol/aldehyde condensation reaction, is typically greater than its reactivity at the secondary hydrogen site of a primary amine. Thus, while the aldehyde will react first at the primary hydrogen site of the primary amine, in reactions employing a molar ratio of aldehyde:primary amine in slight excess of the stoichiometric amount for complete reaction with all the primary hydrogen of the amine, the aldehyde will have a greater propensity to undergo polymerization (condensation) with tannin molecules as described in Equation 2. Thus, in these situations, while the resultant product may be polymerized through methylene bridges from phenol/aldehyde condensation, the Mannich reaction may not induce polymerization.

In contrast, a di-primary amine such as ethylene diamine contains two reactive primary amine sites at each end of the molecule which can lead to polymerization in accordance with Equation 5 as follows:

2Tannin+H$_2$N—R$_7$—NH$_2$+2HCHO→Tannin—CH$_2$—NH—R—NH—CH$_2$—Tannin (Eq. 5)

In any event, for enhancement of detackification and/or coagulation properties, it is desirable that at least some polymerization is induced in the chemically modified tannin through either of the above mechanisms when conducting a Mannich reaction.

The above derivatization reactions employ the same aldehydes as described in connection with the phenol/aldehyde condensation discussion with the preferred aldehyde being formaldehyde.

Nitrogen containing compounds suitable for use in conducting the Mannich reaction include ammonia and any organic amine which contains at least one primary, or secondary amine group and results in a derivatized chemically modified tannin having solubility characteristics as described in connection with Formula IV.

Suitable amines in this category may be aliphatic, cycloaliphatic, aromatic, heterocyclic, aliphatic and cycloaliphatic, aliphatic and aromatic, aliphatic and heterocyclic, cycloaliphatic and aromatic, cycloaliphatic and heterocyclic, aromatic and heterocyclic, etc., in structure. Such amines may be saturated or contain olefinic, acetylenic and/or aromatic unsaturation and they may or may not contain other functional substituents, as long as the derivitized tannin posseses the above described solubility characteristics.

The amines, whether monoamines or polyamines, can be and preferably are hydrocarbyl amines although they can contain one or more suitable substituents such as ether oxygen atoms (—O—), hydroxyl groups (—OH), thioether sulfur atoms (—S$_n$—), mercapto groups (—SH), halogen atoms (—X), keto groups (>CO), thioketo groups (>CS), carboxylgroups (—COOH), ester groups (—COOR), nitrilo groups (—CN), thiocyano groups (—SCN), nitro groups (—NO$_2$), hetero nitrogen atoms (—N═), and the like, provided that each substituted hydrocarbyl group of the amine retains its predominantly hydrocarbonaceous character. When substituted amines are used, they preferably have one or more ether oxygen linkages, one or more thioether linkages, one or more hetero nitrogen atoms and/or one or more hydroxyl groups.

Mixtures of suitable amines can be used such as for example commercial mixtures of straight chain, branched chain and cyclic ethylene polyamines having approximate overall compositions falling in the range corresponding to diethylene triamine to pentaethylene hexamine. Suitable amines can be formed from compounds having combinations of primary and/or secondary amino groups in the molecule. Amines containing tertiary nitrogen groups are also suitable, provided at least one primary or secondary nitrogen group is also present in the amine.

More specifically, suitable amines can be represented by the following structural formulas:

$$R^9\text{—NH—}R^{10} \quad (IX)$$

$$R^{11}\text{—HN—Y—NH—}R^{12} \quad (X)$$

or mixtures thereof, where $R^9$ and $R^{10}$ are independently a H atom (with the proviso that not both $R^9$ and $R^{10}$ are hydrogen), linear or branched $C_1$ to $C_{14}$ alkyl, $C_5$ to $C_6$ cycloalkyl, a $(CH_2)_n$—OR radical, where $R^{13}$ is linear or branched $C_1$ to $C_5$ alkyl and n is an integer having a value from 2 to about 5, or where $R^9$ and $R^{10}$ are joined together to from a saturated heterocyclic ring with the nitrogen atom and where the ring atoms can contain one or more hetero atoms selected from the group consisting of O, N, or mixtures thereof with the remainder being carbon atoms. $R^{11}$ and $R^{12}$ are independently a H atom, linear or branched $C_1$ to $C_{14}$ alkyl, a $C_5$ to $C_6$ cycloalkyl, a $(CH_2)_n$—OR$^{13}$ radical, or where $R^{11}$ and $R^{12}$ are joined together to form a saturated heterocyclic ring with the two nitrogen atoms and where the ring atoms can contain one or more atoms selected from the group consisting of O, N, or mixtures thereof with the remainder being carbon atoms, and where Y is a $C_1$ to $C_6$ alkenyl, or a —$(C_pH_{2p}A)_kC_pH_{2p}$— radical where A is NH or O, p is an integer having a value from 1 to about 4, and k is an integer having a value from 1 to about 6. When $R^9$ and $R^{10}$ or $R^1$ and $R^{12}$ are joined together to form a saturated heterocyclic ring with their corresponding nitrogen atom or atoms, the resulting ring can include hetero atoms to form ring structures such as morpholine, piperazine, and the like.

Illustrative monoamines and polyamines which may be employed include methyl amine, ethyl amine, n-butyl amine, pentyl amine, n-hexylamine, heptyl amine, n-octylamine, n-tetradecylamine, n-hexadecylamine, dodecyl amine, isopropyl amine, sec-butyl amine, t-butyl amine, t-octyl amine, n-stearylamine, N,N- dimethylaminopropylene-diamine, dehydroabietylamine, aniline, cyclohexyl amine, didecylamine, ditetradecylamine, distearylamine, dicoconut fatty amine, ditallow fatty amine, 2-ethylhexylamine, undecylamine, laurylamine, stearylamine, oleylamine, linoleylamine, linolenylamine, eleostearylamine, 1,2-diamino cyclohexane, 1,4-diamino cyclohexane, 4,4'methylenebis(cyclohexylamine), cyclopentylamine, 1-amino-4-methylcyclohexane, 1-amino-(2,6-dimethyl)cyclohexane, 2-aminonorbornane, 4-aminocyclohexene, benzylamine, melamine, 2,4-diamino-6-phenyl-1,3,5-triazine, 4-(2,4-di-tert-amylphenoxy) butylamine, o-, m- and/or p-toluidine, dimethyl amine, diethyl amine, dipropyl amine, didecyl amine, diisopropyl amine, di sec-butyl amine, N-tert-butylisopropyl amine, dihexylamine, N-methyl-N-amylamine, bis (ethylcyclohexyl)amine, N-octyl-N-cycloheptylamine, tributylamine, tetraaminoneopentane, ethanolamine, diethanolamine, propanolamine, 2-amino-1-hexanol, 2-amino-1-butanol, 3-amino-1-propanol, 2-amino-1-propanol, 2-chloroethyl amine, trishydroxyaminomethane, 2-(2-aminoethylamino)-ethanol, 2-[2-(2-aminoethylamino)-ethylamino]-ethanol, 1-(beta-aminoethyl)-2-imidazolidone, N,N'-di-beta-aminoethyl)imidazolidone-2,2-(2-aminoethylamino)-5-nitropyridine, 3-amino-N-ethylpiperidine, 2-(2-aminoethyl)-pyridine, 5-aminoindole, 3-amino-5-mercapto-1,2,4-triazole, N-aminoethyl piperazine, N,N'-bis(aminoethyl)piperazine, N,N'-bis (piperazinyl) ethane, 1,4-diamino piperazine, 4-(aminomethyl)-piperidine, ethylenediamine, 1,3-diamino propane, 1,4-diamino butane, 1,5-diamino pentane, 1,7-diamino heptane, 1,8-diamino octane, 1,10-diamino decane, 1,12-diamino dodecane, 2,2-dimethyl-1,3-propanediamine, 3,3'diamino-N-methyl dipropyl amine, 1,2-propylenediamine, 1,3-propylenediamine, methylaminopropylenediamine, dipropylenetriamine, di-(1, 2-butylene)triamine, tris(2-amino ethyl)amine, N-(2-aminoethyl)-1,3-propanediamine, hexamethylenediamine, N-(beta-cyanoethyl)ethane-1,2-diamine, triethylenetetramine, 1,3,6,9-tetraamino-octadecane, 1,3,6-triamino-9-oxodecane, N-methyl-1,2-propanediamine, tetra-(1,2-propylene)pentamine, diethylenetriamine, triethylenetetramine, tetraethylenepentamine, pentaethylenehexamine, adenine, guanine, cytosine, guanidine, aminoguanidine, guanylurea, 2,2-diethoxyethylamine, 2,2-dimethoxyethylamine, 4,4-diethoxybutyl amine, 2-amino-1-butanol, 4-amino-1-butanol, butyl 12-aminododecanoate, N-(2-aminoethyl)-piperidine, 2-amino-2-ethyl-1,3-propanediol, N-(2-aminoethyl)-pyrrolidine, o-, m- and/or p-aminoacetophenone, 5-aminonaphthene, 1-aminoanthraquinone, 2-aminoanthraquinone, p-phenylazoaniline, aminothiophenol, 2-aminobenzophenone, 4-aminobenzophenone, o-aminobenzyl alcohol, 2-aminofluorene, 2-amino-9-fluorenone, 4-amino-9-fluorenone, N-aminohomopiperidine, 4-aminoantipyrine, 4-amino-2,1,3-benzothiadiazole, 2-aminobenzothiazole, 3-amino-4-carbethoxypyrazole, 2-amino-5,6-dimethyl-benzimidazole, 1-amino-2,6-dimethylpiperidine, 2-amino-4,6-dimethylpyridine, 2-amino-4,6-dimethylpyrimidine, 3-amino-5,6-dimethyl-1,2,4-triazole, 6-amino-1,3-dimethyluracil, N-(2-aminoethyl)-morpholine, 3-amino-N-ethylpiperidine,and 2-(2-aminoethyl)-pyridine.

The most preferred amine is cyclohexyl amine.

Where the chemically modified tannin is derivatized by aldehyde, it is preferred to employ a mole ratio of chemically unmodified tannin:aldehyde of typically from about 1:5 to about 1:0.1, preferably from about 1:3 to about 1:0.25, and most preferably 1:2.5 to about 1:1 (e.g. 1:2). Suitable reaction temperatures can vary, typically from about 40 to about 120° C., preferably from about 45 to about 115° C., and most preferably from about 50 up to about 100° C. at reaction times of typically from about 1.5 to about 3.0 hours, preferably from about 1.75 to about 2.5 hours, although the reaction time is dictated and controlled by the desired degree of reaction as reflected by viscosity of the reaction mixture.

Attainment of the desired degree of the aldehyde derivatization reaction is evidenced when the derivatized tannin exhibits a Brookfield viscosity at 60 to 80° C., of typically from about 10 to about 250 cps, preferably from about 10 to about 150 cps, and most preferably from about 10 to about 100 cps, as determined at a product concentration in water of about 15–30% by weight, based on the solution weight.

Determination of the target viscosity is primarily dictated by such considerations as the need to avoid gelling and the desired shelf life as discussed in more detail in connection with Mannich reaction.

Aldehyde condensation is typically conducted at a pH of typically from about 2 to about 6.5, preferably from about 2.5 to about 6, and most preferably from about 3 to about 5.

Derivatization by the Mannich reaction is well known. As with the aldehyde derivatization, the time required for the reaction depends on the nature of the exact reactants employed and reaction conditions, such as temperature and reactant concentration.

The mole ratio of aldehyde:amine employed typically will vary from about 3:1 to about 0.5:1, preferably from about 2:1 to about 0.75:1 and most preferably from about 1.5:1 to about 1:1 (e.g. 1:1).

The mole ratio of aldehyde:chemically unmodified tannin employed, will typically vary from about 4:1 to about 0.1:1, preferably from about 3:1 to about 0.5:1, and most preferably from about 2:1 to about 1:1 (e.g. 1.8:1).

The most preferred mole ratio of tannin:amine:aldehyde:chemical modification agent is 1:1.8:1.8:0.5.

The Mannich reaction is conducted at a pH of typically less than about 7 using a strong acid, typically HCl. The extent of reaction is monitored by checking the viscosity. More specifically, the reaction mixture is heated at a temperature of from about 65° to about 95° C. until a reaction product forms which has an intermediate viscosity within a "key intermediate viscosity range" and then terminating the reaction by one or more of the steps of external cooling, adding quench water, and/or by adding acid.

Since the shelf life of the product is a function of the key intermediate viscosity, one can calibrate viscosity and resultant shelf life by varying the intermediate viscosity for each given reactant system and determining the effective shelf life. Desirable shelf life times can vary from 1 week to several months, depending on the desired end use. Gelling of the system signifies an end to the shelf life.

The key intermediate viscosity range generally falls within a narrow range for a given system, e.g. within 2 to 4 cps. Common key intermediate viscosities range from about 35 to 250 cps when measured at 88° C. on a Brookfield LVT viscosimeter at 20% solids content.

The solids content of the resultant modified tannin is preferably about 20% to about 60% by weight and the pH is preferably less than 3.0. Preferably an antifoam material such as silicon antifoam exemplified by Silicone B made by Dow Corning Corporation, a mineral seal oil, or a high molecular weight alcohol may be added to prevent excessive foaming.

The weight average molecular weight of the tannin derived product of this invention after polymerization is generally within the range of 5,000 to 500,000.

Preferably, derivatized tannin products of this invention have a charge density of typically between about 0.7 and about 5.0, preferably between about 1 and about 3, and most preferably between about 1 and about 3.5 (e.g. 2.0) milliequivalents per gram (meq/g).

The charge density of a cationic polymer is determined by titration with poly(vinyl sulfuric acid) potassium, PVSAK, after addition of an indicator, toluidine blue. Addition of the indicator to a cationic polymer solution causes it to turn blue. Titration with PVSAK will cause the indicator to turn bluish purple at the end point. The charge density (meq/gm) is calculated from the titrant value. It is valuable to know the charge density because the same is a function of the efficacy of the tannin products of the present invention as a coagulant or detackifier.

The derivatized tannin products of the present invention, particularly those which are amphoteric, provide extremely effective control of sticky materials in aqueous systems such as paint spray booth wastes employing organic solvent based paints, pitch particles, inks and adhesive materials in aqueous pulp suspensions, particularly under alkaline pH conditions, e.g. between about 7 and 12, preferably between about 8 and 11. The derivatized tannin products of the present invention do not require the presence of clays which can present considerable dewatering problems, or amphoteric metals, such as zinc, which can present waste disposal concerns. Hydrolyzed polyacrylamide polymer can be used to enhance flocculation and/or dewatering. However, the derivatized tannin products of this invention, by themselves, can often provide a sludge which is readily dewatered, particularly when used to control high solids enamel paints which have been prediluted with an organic solvent formulation.

In accordance with a first aspect of this invention, sticky materials in organic solvent based paint systems such as oversprayed paint particles in paint spray booth water are detackified by adding a derivatized tannin product of the present invention to the paint spray booth recirculating water system.

More specifically, detackification is necessary when employing organic solvent based paint systems. In contrast, waterborne paints do not have a stickiness problem, but because the paint disperses in the paint spray booth water, it must be coagulated as described hereinafter in more detail.

At acid pH the derivatized tannin product is either dissolved or dispersed as a hydrocolloidal suspension. Dissolution can be accomplished by contact with such acids as nitric, sulphuric, orthophosphoric, hydrofluoric, hydrochloric, oxalic, and the like.

As the paint spray booth water pH is raised above about 6.5, the solubility of the derivatized tannin decreases and forms a floc. It is an advantage of the present invention that capping of the phenolic hydroxyl groups on the tannin by chemical modification can alter (increase) its hydrophobicity advantageously for detackification purposes, decreasing the size of the floc (and increasing its surface area) and hence its efficiency. Without wishing to be bound by any particular theory, this is believed to stem from adsorbtion of the derivatized tannin onto the pigment particles. Because the derivatized tannins are hydrophobic, the solvent surrounding the pigment drains away causing the paint to become non-adherent.

Generally, the derivatized tannin products are added to the paint spray apparatus water in dissolved or dispersed form to achieve a concentration in the spray booth water of typically at least about 350 ppm, and typically from about 200 to about 1,000, preferably from about 200 to about 750, and most preferably from about 200 to about 400 ppm concentrations.

The derivatized tannin products may optionally be employed in combination with a second component selected from the group consisting of pH control agents, polymers derived from certain hydrophilic-lipophilic quaternary ammonium repeat units, diallyldialkyl quaternary ammonium polymers, surface active agents, high molecular weight flocculants, inorganic flocculants, and the like and mixtures thereof. The pH control agents may be added to the recirculating water system to establish and maintain a pH in a range of at least 7, preferably in a range of from 8 to 12, and most preferably in a range of from 8.5 to 11. Such pH control is implemented before the paint is sprayed and before or after derivatized tannin addition. The particular pH selected will depend in part on whether the paint is organic solvent based or aqueous based. For solvent based paints the pH of the paint spray booth water can range typically between about 8 and about 12, whereas for aqueous based paints the pH will typically be less than about 8.5 but higher than 7.

The derivatized tannin products of the present invention become insoluble under the above alkaline pH conditions using, for example, NaOH or KOH, and thus enhance their ability to detackify the paint particles in the recirculating aqueous system.

More specifically, the pH control agent can be selected to act as a buffer and stabilize any pH upsets which may occur during the operation of the paint spray booth. That is, as is well known to those skilled in the art, the addition of acidic solutions of detackifying agents into an alkaline recirculating water system will require subsequent monitoring and control of the pH of the recirculating system to maintain the pH within the above-defined pH limits. The addition of a pH control agent, such as calcium carbonate, sodium carbonate, calcium sulfate, sodium borate, sodium silicate and the like, tends to buffer the system, and somewhat reduce the level of monitoring necessary to maintain the pH within the above limits. By establishing and maintaining elevated pH, control agents ensure the continued insolubility of the tannin derived products in the recirculating water system, which in turn enhances the latter's ability to detackify the paint particles which are present in the system. The amount of pH control agent added to the system is not critical to the invention, and is added to the system in amounts sufficient to accomplish the desired effect and purpose for which it is added. In general the pH control agent is added to the system in an amount sufficient to maintain the pH at the desired level.

Suitable surface active agents for use in this invention include, but are not limited to anionic, cationic, nonionic, and amphoteric surface active agents which improve the dispersibility and emulsifiability of the paint particles in the system. Examples of suitable surface active agents include alkylbenzene sulfonates, higher alcohol sulfuric esters, alkylsulfuric esters, sodium alkylsulfates, alkylsulfosuccinates, dialkylsulfosuccinates, alkylnaphthalenesulfonate-formalin condensates, alkylnaphthalenesulfonates, sulfonated heterocyclic compounds, fatty acid-amino acid condensates, polyoxyethylene alkyl ethers, polyoxyethylene alkylaryl ethers, polyethylene glycol fatty acid esters, polyoxyethylene fatty acid amide ethers, polyethylene glycol alkylamine ethers, polyhydric alcohol fatty acid esters, polyoxyethylene polyhydric alcohol fatty acid esters, and alkylolamides, betaine type, imidazoline type, sulfonate type, and alanine type; and cationic surface active agents such as alkyl-pyridinium hydrochlorides, alkyltrimethylammonium halides, polyoxyethylene alkylamines, and polyoxyethylene dodecylamines.

Suitable flocculants for use in this invention include, but are not limited to, cationic, anionic or non-ionic polyacrylamides, polvinylamines, polyacrylates, polymethacrylates, polyethyleneoxides, and the like, and mixtures thereof.

In accordance with a second aspect of this invention, pitch and stickies in a pulp and paper making system may be controlled or inhibited by adding the tannin derived products of the invention to an aqueous pulp suspension where the tannins can complex with and thus inactivate the dispersed pitch particles, or alternatively, the tannins can be applied to the paper machine equipment surfaces where sticky deposits are prone to form and thereby provide a polymeric film coating which is resistant to the formation of sticky deposits.

More specifically, when derivatized tannins, preferably amphoteric derivatized tannins, of the present invention are applied to felts employed in the papermaking process, the felts resist the build-up of sticky deposits. In particular, the adhesion of sticky material associated with recycled fiber is effectively controlled. This is particularly advantageous for papermaking systems employing a substantial proportion, of at least about 10%, recycled fiber, e.g. at least 70% of the fibers are recycled material.

The derivatized tannins of this invention can be applied in aqueous solution directly to the equipment being treated. Over-application of the modified tannins to papermill felt, however, can result in a build-up of deposits derived from the derivatized tannin itself and thus, in the case of felts, in reduced porosity which can eventually retard water removal or otherwise affect production. Thus, the treatment dosage of derivatized tannin should generally be adjusted to the demands of the particular system being treated.

The derivatized tannins of this invention are typically supplied as liquid compositions comprising aqueous solutions of the derivatized tannin. Derivatized tannin concentrations in the solutions may range from the relatively dilute concentrations suitable for continuous application, up to the solubility or gelling limits of the derivatized tannin, but generally the solutions are relatively concentrated for practical shipping and handling purposes. Indeed, the liquid compositions may comprise additional materials which further the dissolution of the derivatized tannin so as to allow more concentrated compositions. An example of these materials are alkoxyethanols such as butoxyethanol. Aqueous compositions suitable for shipping and handling will generally contain between 5 and 50 weight percent, active, of the derivatized tannin of this invention. Such solutions may also contain cationic surfactants or surfactant solutions may be supplied separately from the derivatized tannin and then either applied to the felts separately (e.g. by using separate shower systems) or mixed prior to application. In general, aqueous compositions suitable for shipping and handling will contain between 5 and 50 weight percent total of the derivatized tannin.

The most appropriate treatment dosage depends on such system factors as the nature of the adhesive material, and whether cleaning is continuous or periodic. Even liquid compositions comprising relatively high concentrations of a modified tannin (for example, 50%) may be employed at full strength (100% as the liquid composition), for example by spraying the undiluted liquid composition directly onto the felts. However, particularly where continuous treatment is practiced, the compositions may be advantageously diluted at the treatment location with clean fresh water or other aqueous liquid. Where necessary for water economy, a good quality process water may be adequate for dilution.

The suitable pitch or stickies control can be realized at application concentrations as low as 2 ppm of the derivatized tannin, especially where continuous treatment is practiced, and "continuous treatment" of felt as used herein means that the felt is routinely treated at least once during the cycle between its sheet contact stage and its return stage. This routine treatment is most advantageously applied during the early portion of return stage. The felt can then be contacted with the sheet such that even the sticky material, including that typically associated with recycled fibers, is inhibited from adhering to the felt, and that material which does deposit is more readily washed away when aqueous wash solution is applied during the return stage. In some cases, continuous treatment is not practical and treatment with the modified tannins of this invention may be periodic. For example, aqueous solutions of the derivatized tannins may be sprayed on the felt until the felt is satisfactorily conditioned and the spray may then be discontinued until supplemental conditioning is needed to further inhibit the build-up of deposits on the felt.

More detailed treatment procedures are described in U.S. Pat. No. 4,995,944, the disclosure of which is herein incorporated by reference.

For typical papermaking processes, particularly those using substantial amounts of recycled fiber, the modified tannin is generally applied at a rate at least about 0.002 grams per square meter of felt per minute ($g/m^2$-min), preferably about 0.01 $g/m^2$-min. or more where continuous treatment is used, and preferably about 0.02 $g/m^2$-min. or more during the application period where application is intermittent. Preferably, application rates of 0.5 grams per square meter per minute or less are used to minimize the potential for felt plugging. Thus, for standard papermaking machines with felt widths of 2 to 7 meters and felt lengths of 10 to 40 meters, the application rate is commonly between about 0.02 and 20 grams of derivatized tannin per minute per meter width (i.e. g/m-min), more commonly between about 0.05 and 12.5 g/m-min. One technique involves applying 1 g/m-min. or more initially, until the felt is conditioned. Once conditioning has been accomplished, maintenance application rates may be lower, or as explained above, application may even be discontinued periodically.

Other equipment such as wires, screens, filters, rolls, and suction boxes, and materials such as metals, granite, rubber, and ceramics may also be advantageously treated in accordance with this invention. However, the invention is particularly useful in connection with treating felts and the like equipment components with pores suitable for having water drawn therein (i.e., relatively fine pores) where the build-up of substantial deposits is undesirable; as opposed for example to other equipment such as metal and plastic wires having relatively large pores for draining water therethrough, where a certain amount of deposit build-up is not considered to create undesirable problems.

In any case, the concentration of derivatized tannin in the aqueous solution ultimately applied to the felt or other papermaking equipment should be at least about 0.0002 weight percent. Preferably, in order to enhance the uniformity of distribution, continuous treatment of felt through a felt shower system will be conducted with an aqueous shower solution having between about 0.0002 weight percent and about 0.02 weight percent of modified tannin.

In a third aspect of this invention, the tannin derived products of the invention may be used to break oil-in-water emulsions. In accordance with this embodiment, the modified tannins of the invention may be added to a waste stream containing emulsified oil in an amount effective to break the oil-in-water emulsion. The specific dosage amount may vary widely, depending upon the particular oil-in-water emulsion being treated, the degree to which the oil-in-water can be effectively mixed or agitated, and the degree of separation desired. In general, the dosage amount of derivatized tannin product added to a waste stream is in the range of from about 1 to about 20,000 ppm, preferably from about 10 to about 2000 ppm. The pH of the waste stream is preferably adjusted in the range 4 to 14, and is most preferably in the range 5 to 11. The pH may be adjusted with any alkaline or acid agent.

In a fourth aspect of this invention, the tannin derived products of this invention may be used to coagulate waterborne paint particles in a paint spray booth recirculating water system. In accordance with this embodiment of the invention, the modified tannins of the invention are added to the spray booth water either before or after the water is contacted with the oversprayed water-borne paint particles.

From the above discussion, it will be observed that the derivatized tannins of the present invention have a variety of utilities, such for example as a demulsifier for any oil-in-water emulsion which can be found in refinery waste streams, food waste (salad dressing vat washings) and the like. Textile waste streams could be treated to remove dyes and inorganic particles from stone washing. Raw water can be clarified for removal of silt and humic acids and the like.

The following examples are provided to illustrate the present invention, but are not to be construed as limiting the invention in any way except as provided in the appended claims. All parts and percentages are by weight unless otherwise indicated.

EXAMPLE 1

Chemical Modification by Acetic Anhydride; Derivatization with Mannich (cyclohexylamine/HCHO)

Part A

Into a clean and dry reactor were placed 800 grams of glacial acetic acid, 800 grams of Mimosa tannin extract and 137.5 grams of acetic anhydride (mole ratio 1:0.5). The reactants were heated under a nitrogen blanket to 105° C. and held at this temperature for 1½ hours. The temperature was then lowered to 50° C. and 1,087 grams of deionized water was added.

Part B

The reactants from Part A were cooled to 30° C. and 475 grams of cyclohexylamine was slowly added while maintaining the temperature below 40° C. Next, formaldehyde was added in the form of 387.5 grams of 37% active formaldehyde again maintaining the temperatures below 40° C. (mole ratio of unmodified tannin:cyclohexylamine:HCHO=1:1.8:1.8). The solution was then heated to initiate the reaction. The temperature was controlled so that it was not allowed to go above 90° C. When the viscosity reading reached 160–180 cps, the desired degree of reaction was obtained. At this point the reaction was quenched by external cooling and the addition of 700 grams of deionized water followed by 612 grams of 31% muriatic acid (HCL).

The reaction product was diluted with 5,000 grams of deionized water to yield a solids content of 14–15% and a Brookfield viscosity of 20–30 cps. This material was placed back into the reactor and 50% of the liquid portion removed at 85° C. with applied vacuum. The final product, designated Sample No. 1, was adjusted to a solids content 19–20%, a pH value of 1–1.4 and a Brookfield viscosity of 20–100 cps.

The reaction product obtained was stored at ambient conditions and after six months was still in a liquid form and had not gelled or solidified.

EXAMPLE 2

The procedure of Example 1 was repeated, however after quenching the reaction with deionized water at the end of the reaction no muriatic acid was added. The resultant product, designated Sample No. 2, was a solid type slurry which could either be filtered off and dried or spray dried to a reddish-brown powder. This dried powder could be resolubilized in a muriatic acid-water solution to yield a final product similar to that obtained in Example 1.

EXAMPLE 3

Chemical Modification with Quat Amine; Derivatization with HCHO

A typical synthesis procedure for preparing the quaternized and derivatized tannin is as follows:

Part A

Charge reactor with 17.73 parts deionized water and with mixing add 14.95 parts mimosa tannin. Heat the tannin dispersion at 70° C. for 30 minutes. Cool to ambient temperature and with cooling add 12.43 parts sodium hydroxide solution (50%) dropwise with the temperature below 50C. Add 28.74 parts N-(3-chloro-2-hydroxypropyl) trimethylammonium chloride (50% solution), mole ratio tannin:quat amine=1:2, dropwise at a temperature below 45° C. Heat the solution at 48° C. for 90 minutes.

Part B 7.69 parts formaldehyde (37% solution) is added to the heated solution of Part A at 48° C. and the temperature increased to 97.2° C. (mole ratio unmodified tannin:HCHO= 1:2). The reaction temperature is maintained at 97.2° C. for about 1 hour. At the end of 1 hour, the final charge of 18.46 parts deionized water is added and heating continued at 97.2° C. for an additional hour. When the viscosity reaches 75 cps±10, the reactor is cooled and the contents discharged. The resulting product is designated Sample 3.

EXAMPLE 4

Figure 1:
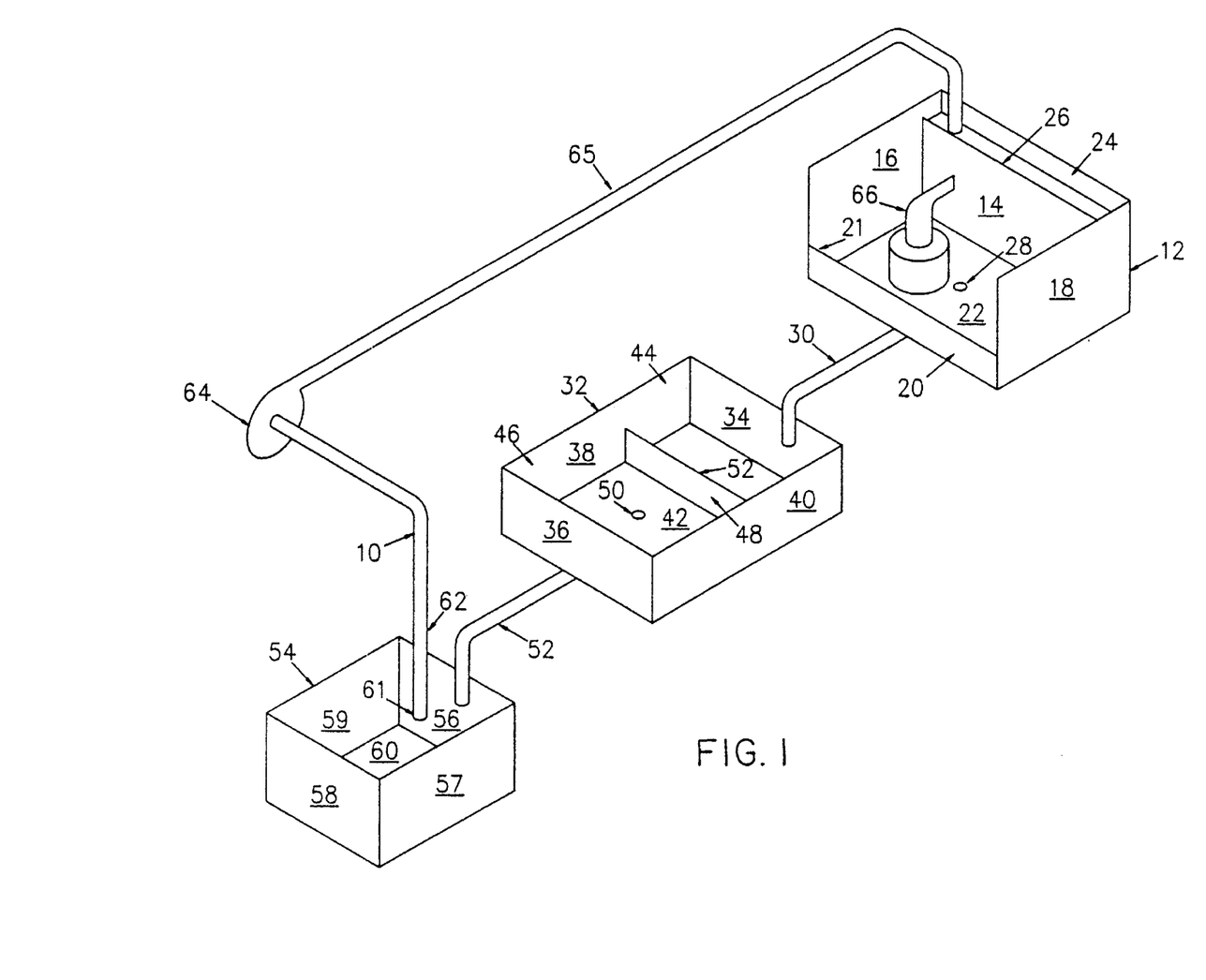
FIG. 1 is a schematic isometric drawing of an apparatus used for evaluating control of paint overspray

The effectiveness of the modified tannins of this invention in detackifying paint overspray was evaluated using the paint spray apparatus depicted schematically in FIG. 1 and described in U.S. Pat. No. 4,948,513, the disclosure of which is herein incorporated by reference. The paint spray apparatus (10) comprises a spray chamber (12) which has a front wall (14), side walls (16) and (18), a rear wall (20) and a floor (22). An elevated reservoir (24) is positioned at the front wall (14) with the top edge (26) of the front wall forming the lowest side of the reservoir such that water overflowing from the reservoir form a water curtain for the front wall (14).

An outlet (28) is provided in the spray chamber floor (22), and water overflowing from the reservoir passes into outlet (28) and through piping (30) to the second mixing chamber (32). The mixing chamber (32) comprises end walls (34) and (36), side walls (38) and (40), and floor (42), and is divided into a first compartment (44) and a second compartment (46) by a weir (48). Water flowing from piping (30) flows into the first compartment, and an outlet (50) is provided in the floor of the second compartment. The top edge (52) of the weir terminates below the walls of the mixing chamber such that water overflows from the first compartment into the second compartment, and then into outlet (50). Piping (52) directs the water from outlet (50) into the third mixing chamber (54)

which comprises four walls (56) (57) (58) and (59), and floor (60). The open end (61) of inlet piping (62) for pump (64) is positioned in the mixing chamber (54) such that the pump (64) can be used to withdraw water from the mixing chamber. Water pumped from the mixing chamber (54) is directed through pump outlet piping (65) into the elevated reservoir (24). The top edge (21) of the rear wall (20) in spray chamber (12) terminates lower than the front top edge (26) of the front wall (14), and a paint spray gun (66) is positioned such that paint spray may be directed toward the front wall (14) from a distance of approximately nine inches. The capacity of the recirculating water system is about 14 liters and the recirculation rate is approximately 7.6 liters per minute.

In operation water circulation is begun to provide a curtain of water overflowing from top edge (26) toward floor (22) and passing adjacent to the front wall (14) of spray chamber (12). Paint is then sprayed from spray gun (66) toward the front wall (14) such that the spray becomes entrained in the water curtain. Generally, paint is sprayed at a rate within the range of from about 2.0 milliliters per minute to about 5.0 milliliters per minute, and the spraying continues until about 100 milliliters of paint has been sprayed.

In each run, about 350 ppm of each tannin derived product (based on 100% solids basis) was added to the water. The water was adjusted to a pH of about 8.0 to 10 using caustic. After circulating the system water thoroughly to assure a complete mixing of the tannin product, a total of 100 milliliters of paint was sprayed, and the floating solids in the storage chamber examined and rated. The detackified paint solids, after paint spraying was completed, were evaluated by rubbing them between thumb and forefinger. An excellent rating was interpreted as rendering complete detackification.

EXAMPLE 5

Chemical Modification with Quat Amine

Five quaternary alkyl amine tannins, Samples numbered 4 to 8, were prepared by contacting mimosa tannin with N-(3-chloro-2-hydroxypropyl) trimethylammonium chloride in the presence of sodium hydroxide, in accordance with the procedures of Example 3, Part A, with the exception that the tannin:quaternary amine mole ratio as reported in Table 1 was employed and the reaction mixture was cooled after heating the solution at 48° C. for 90 minutes. As shown in Table 1, Sample No. (5) demonstrated some paint detackifying activity. This activity was significantly increased by derivatization as illustrated in Table 2.

Comparative Example 1

A melamine-formaldehyde condensate purchased from Cytec under the tradename Magnifloc 515C is designated Comparative Sample 1.

Comparative Example 2

A mimosa tannin derivatized with ethanolamine and formaldehyde in accordance with the procedures of U.S. Pat. No. 4,558,080 was prepared.

The resulting product is designated Comparative Sample No. 2.

EXAMPLE 6

Seven mimosa tannin derived samples designated Sample Nos. 9 to 15 were prepared from mimosa tannin chemically modified with a quat alkylamine N-(3-chloro-2-hydroxypropyl) trimethylammonium chloride and derivatized with HCHO in accordance with Example 3, Parts A and B, using the starting mole ratios reported at Table 2. It can be seen from Table 2 that Sample No. 13 is an excellent paint detackifier.

The performance of the Sample 13 as a solvent paint detackifier is demonstrated versus melamine formaldehyde condensate (Comparative Sample 1) and a derivatized tannin using a primary amine (monoethanolamine) (Comparative Sample 2) in Table 3. As shown, Sample No. 13 provides superior detackification to the industry standard of Comparative Samples 1 and 2.

TABLE 1

Optimization of the Tannin/Quat Mole Ratio

| Sample No. | Tannin:Quat Mole Ratio | Paint Detackification | Cationic Charge |
|---|---|---|---|
| (4) | 1:3 | Poor | +4.4 |
| (5) | 1:2 | Fair | +3.5 |
| (6) | 1:1 | Poor | +1.4 |
| (7) | 1:0.5 | Poor | +1.0 |
| (8) | 1:0.25 | Poor | +0.4 |
| Melamine Formaldehyde Condensate (Comparative Sample No. 1) | | Good | +1.5 |

NOTES:
Detackification assessed upon high solids enamel paints (Solvent)
Treatment screened from pH 8.0–10.0
Treatment dosage 350 ppm active
Paint spray rate approximately 2–4 ml/min.
Quat: N-(3-chloro-2-hydroxypropyl) trimethyl ammonium chloride

TABLE 2

Optimization of the Tannin/Quat/Formaldehyde Mole Ratio

| Sample No. | Tannin:Quat:CH$_2$O Mole Ratio | Cationic Charge (meq/g) | Paint Detackification |
|---|---|---|---|
| (9) | 1:0.5:1 | 1.0 | Poor |
| (10) | 1:0.5:0.5 | 1.0 | Poor |
| (11) | 1:0.5:0.25 | 1.0 | Poor/Fair |
| (12) | 1:0.5:0.21 | 1.0 | Poor/Fair |
| (13) | 1:2:2 | 3.5 | Excellent |
| (14) | 1:2:1 | 3.5 | Good |
| (15) | 1:2:0.5 | 3.5 | Poor |
| Melamine Formaldehyde Condensate (Comparative Sample No. 1) | | 1.5 | Good |

NOTE:
Detackification assessed upon high solids enamel paint (Solvent)
Treatment screened from pH 8.0–10.0
Treatment dosage 350 ppm active
Paint spray rate approximately 2–4 ml/min
Quat: N-(3-chloro-2-hydroxypropyl) trimethyl ammonium chloride

TABLE 3

Efficacy Study of Quat Tannin

| Treatment | Comp. Sample 1 | Comp. Sample 2 | Sample 13 | Sample 13 | Sample 13 | Sample 13 | Sample 13 |
|---|---|---|---|---|---|---|---|
| Paint Type | H.S.E. | H.S.E. | H.S.E. | H.S.E. | H.S.E. | H.S.E. | H.S.E. |
| Paint Color | Red Metallic | Red Metallic | Red Metallic | Desert Tan | Flat Black | Sandstone | Chassis Black |
| Treatment Concentrate (ppm active) | 350 | 350 | 350 | 350 | 350 | 350 | 350 |
| pH Screening Range | 8–10 | 8–10 | 8–10 | 8–10 | 8–10 | 8–10 | 8–10 |
| Rate of Paint Spray (ml/min) | 2–4 | 2–4 | 2–4 | 2–4 | 2–4 | 2–4 | 2–4 |
| Detackification | Good | Poor | Excellent | Excellent | Excellent | Excellent | Excellent |

NOTES:
H.S.E. — High Solids Enamel Paint (Automotive Industry Coatings)
Comparative Sample 1 - Melamine Formaldehyde Condensate
Comparative Sample 2 - Tannin modified with primary amine (monoethanolamine)
Sample 13 - Tannin modified with quaternary amine N-(3-chloro-2-hydroxypropyl) trimethyl ammonium chloride and derivatized with formaldehyde.

EXAMPLE 7

The tannin derived products of the invention, prepared as described below and designated Samples 9 to 15, are evaluated for their effectiveness in breaking oil-in-water emulsions using synthetic oil-in-water emulsions. These synthetic oil-in-water emulsions are formulated in the laboratory to serve as a reproducible method to quantitatively evaluate the emulsion breaking ability of the tannin compositions of this invention. The emulsions are freshly prepared for each test as follows:

The ingredients, a mixture of a Sears Spectrum 10W-40 motor oil (75 wt %) and Petromix No. 9 (available from Witco Chemical) (25 wt %) are blended for 10 minutes in a Waring blender. A 10 g. sample of the blended mixture is added to a clean Waring blender, along with 390 ml. of distilled water, and the resultant mixture blended for 7 minutes. The resulting emulsion is diluted with tap water at a 9:1 wt. ratio, added to one-gallon containers, mixed for 15 minutes, and allowed to stand overnight. The tap water is a 9:1 wt. mixture of Lake Zurich tap water and distilled water at room temperature to reduce the specific conductance of tap water to 450–550 umho/cm. The tap water is not prepared greater than one week in advance of its use.

Figure 2:
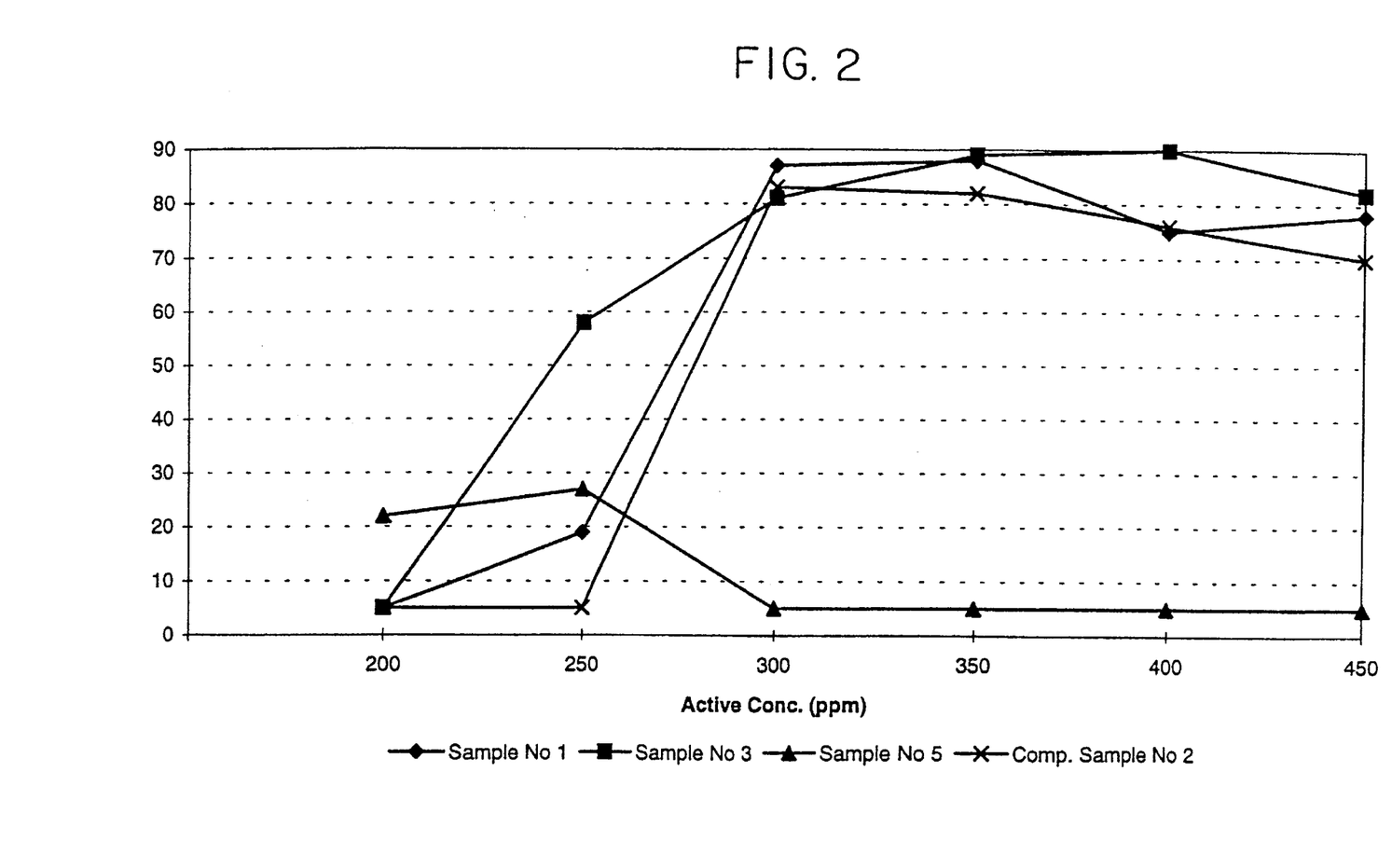
FIG. 2 is a graphical representation of Table 5.

To 100 ml portions of the base emulsions in a beaker are added by pipette a 1% (active ingredient) solution of tannin derived product as specified in Table 4 and at increasing concentrations as specified in Table 5. After being stirred for 5 minutes, the emulsions are allowed to stand for 30 minutes. Any surface oil is skimmed off with an aspirator, being careful not to agitate the beakers. A sample of the water phase is then pipetted into a spectrophotometer cuvette. The percent transmittance (at a wavelength of 470 mm) is recorded. The results are summarized in Table 5 and depicted graphically at FIG. 2. A higher percent transmittance corresponds to a more effective emulsion breaker.

TABLE 4

| Corresponding Example No. Prepn. Procedure | Corresponding Sample No. | Reactants | Reactant Mole Ratio |
|---|---|---|---|
| Ex. 1 | 1 | Tannin:Acetic Anh:CHA:HCHO | 1:0.5:1.8:1.8 |
| Ex. 3 | 3 | Tannin:Quat:HCHO | 1:2:2 |
| Ex. 5 | 5 | Tannin:Quat | 1:2 |
| Comp. Ex. 2 | Comp. Sample 2 | Tannin:Ethanolamine:HCHO | 1:1.8:1.8 |

CHA = Cyclohexylamine
Quat = N-(3-chloro-2-hydroxypropyl)trimethylammonium chloride

TABLE 5

| Sample No. Designations | Conc. (ppm) | 200 | 250 | 300 | 350 | 400 | 450 |
|---|---|---|---|---|---|---|---|
| 1 | % Transmittance | 5 | 19 | 87 | 88 | 75 | 78 |
| 3 | % Transmittance | 5 | 58 | 81 | 89 | 90 | 82 |
| 5 | % Transmittance | 22 | 27 | 5 | 5 | 5 | 5 |
| Comparative Sample 2 | % Transmittance | 5 | 5 | 83 | 82 | 76 | 70 |

EXAMPLE 8

Chemical Modification by Acetic Anhydride; Derivatization with Mannich (cyclohexylamine/HCHO)

This example illustrates the performance of various modified tannins as coagulant for the removal of suspended solids.

Figure 3:
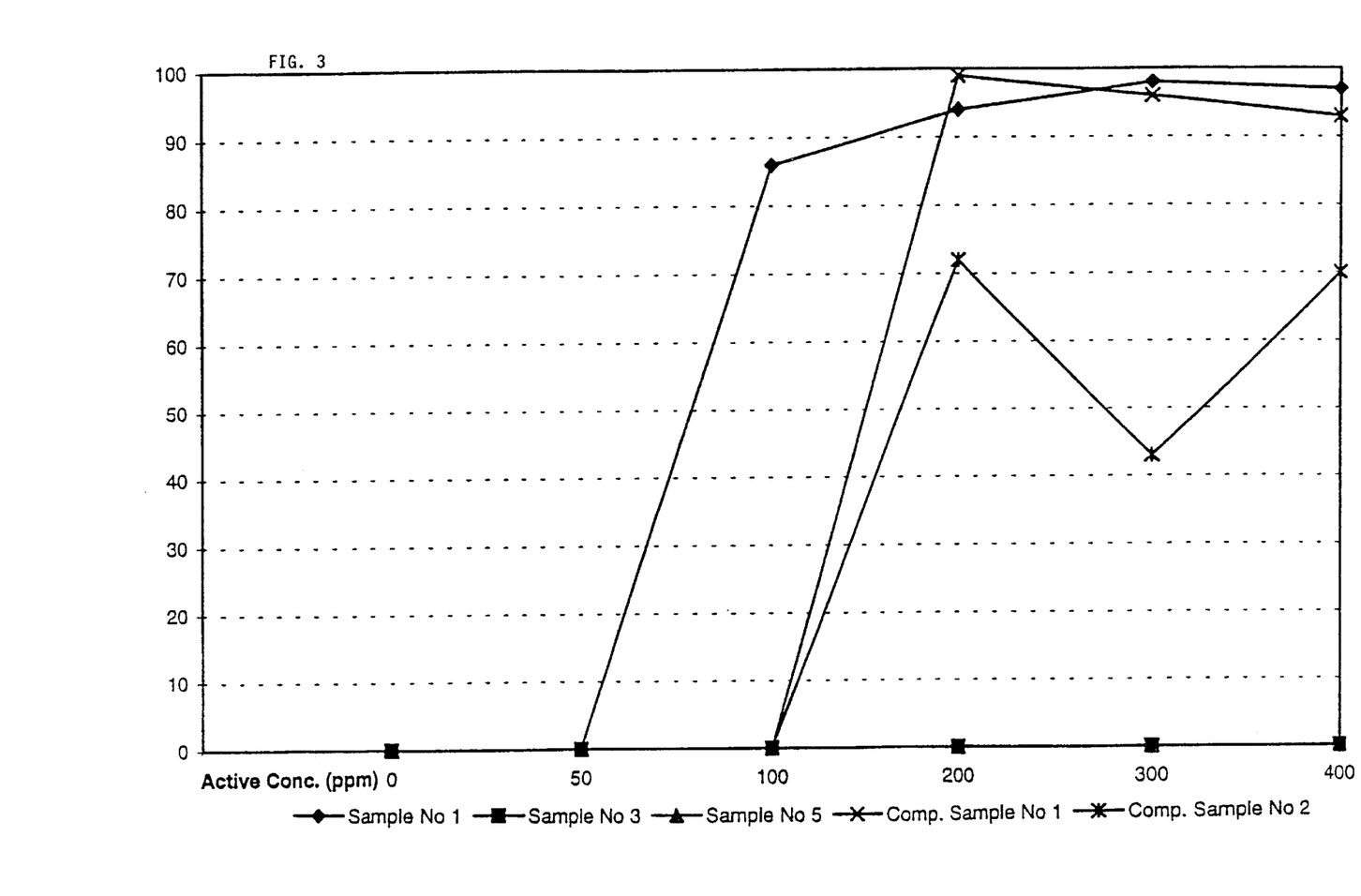
FIG. 3 is a graphical representation of Table 6.

The performance of Sample 1 as a coagulant was assessed upon a 1% dispersion of waterborne paint and the results reported in FIG. 3. The test was conducted by preparing a 1 wt % (active ingredient) stock solution of Sample 1 in water and a 1 wt % stock solution of water based paint in water. To samples of the stock paint solution were added sufficient amounts of the stock Sample 1 solution to reach the active ingredient ppm concentration reported in Table 6. The resulting mixture is mixed for 5 minutes and allowed to stand for 10 minutes.

A sample of the paint stock solution containing the Sample 1 tannin product was added to a spectrophotometer cuvette. The percent transmission at a wavelength of 470 nm was recorded at increasing concentrations of active ingredient as shown in Table 6. These results are shown graphically at FIG. 3. Using the same test procedure, the performance of Sample 1 was compared against Sample 5 (quaternized tannin), Sample 3 (quaternized tannin derivatized with formaldehyde), Comparative Sample 2 (aminomethylated tannin), and Comparative Sample 1 (melamine formaldehyde condensate).

TABLE 6

| Sample No. Designations | Conc. (ppm) | 0 | 50 | 100 | 200 | 300 | 400 |
|---|---|---|---|---|---|---|---|
| 1 | % Transmittance | 0 | 0 | 86 | 94 | 98 | 97 |
| 5 | % Transmittance | 0 | 0 | 0 | 0 | 0 | 0 |
| 3 | % Transmittance | 0 | 0 | 0 | 0 | 0 | 0 |
| Comparative Sample 2 | % Transmittance | 0 | 0 | 0 | 72 | 43 | 70 |
| Comparative Sample 1 | % Transmittance | 0 | 0 | 0 | 99 | 96 | 93 |

The most effective materials were those which provided the highest % light transmittance. As shown in Table 6 and FIG. 3, the most effective treatment was Sample 1 which provided the earliest "break" in water clarity at 100 ppm.

EXAMPLE 9

Chemical Modification by Acetic Anhydride; Derivatization with Mannich (cyclohexylamine/HCHO)

This example illustrates the performance of a mimosa tannin chemically modified with acetic anhydride and derivatized with Mannich reaction using cyclohexylamine and HCHO as a solvent paint detackifier.

Accordingly, a mimosa tannin is chemically modified and derivatized in accordance with the procedures of Example 1 and the product is designated Sample 16.

Table 7 below demonstrates the excellent performance of Sample 16 as a solvent paint detackifier. The treatment was evaluated at a pH 8.5 using the paint spray booth model described in Example 4.

TABLE 7

| TREATMENT | DOSAGE ppm ACTIVE | DETACKIFICATION PERFORMANCE |
|---|---|---|
| Comparative Sample 1 (Melamine Formaldehyde Resin) | 350 | Good |
| Comparative Sample 2 | 350 | Poor |
| Sample 16 | 350 | Good-Excellent |

The examples describe various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A composition comprising tannin containing hydroxyl groups which has been chemically modified and derivatized, wherein (a) the chemically modified tannin is represented by the structural formula:

(VII)

wherein Z is independently Hydrogen or and R is $C_1$ to $C_{10}$ alkyl; n is a number which can vary from 0 to about 2, with the proviso that at least one Z is not hydrogen; and wherein (b) the derivatized tannin is the condensation reaction product of said chemically modified tannin of Formula VII and aldehyde, or aldehyde and at least one member selected from the group consisting of ammonia and organic amine containing at least one primary or secondary nitrogen, said chemically modified tannin being water soluble or dispersible at a pH above 7.

2. The composition of claim 1 wherein the chemically modified tannin is derivatized by reaction with formaldehyde.

3. The composition of claim 1 wherein the chemically modified tannin is derivatized by reaction with aldehyde and at least one member selected from the group consisting of primary amine and secondary amine.

4. The composition of claim 3 wherein the amines are selected from at least one member of the group consisting of aliphatic amine, cycloaliphatic amine, heterocyclic amine, aromatic amine, aliphatic aromatic amine, aliphatic heterocyclic amine, and aromatic heterocyclic amine.

5. The composition of claim 4 wherein the amine is cycloaliphatic.

6. The composition of claim 5 wherein the amine is cyclohexyl amine.

* * * * *